(12) United States Patent
Phadke et al.

(10) Patent No.: US 9,973,098 B2
(45) Date of Patent: May 15, 2018

(54) FIXED FREQUENCY DISCONTINUOUS CONDUCTION MODE FLYBACK POWER CONVERTERS EMPLOYING ZERO VOLTAGE SWITCHING

(71) Applicant: Astec International Limited, Kwun Tong, Kowloon (HK)

(72) Inventors: Vijay Gangadhar Phadke, Pasig (PH); John Faustino Boqueo Begino, III, Pasig (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days. days.

(21) Appl. No.: 14/873,495

(22) Filed: Oct. 2, 2015

(65) Prior Publication Data
US 2017/0054375 A1    Feb. 23, 2017

Related U.S. Application Data

(60) Provisional application No. 62/207,208, filed on Aug. 19, 2015.

(51) Int. Cl.
*H02M 3/335*  (2006.01)
*H02M 1/00*  (2006.01)

(52) U.S. Cl.
CPC ............... *H02M 3/33569* (2013.01); *H02M 2001/0058* (2013.01); *Y02B 70/1491* (2013.01)

(58) Field of Classification Search
CPC ...... H02M 3/33507; H02M 1/32; H02M 1/34; H02M 3/33569; H02M 2001/0058; Y02B 70/1491
USPC ............. 363/21.12, 21.18, 56.09, 56.11
See application file for complete search history.

(56) References Cited

U.S. PATENT DOCUMENTS

| | | | | |
|---|---|---|---|---|
| 5,673,185 A | * | 9/1997 | Albach | H02M 1/12 363/21.12 |
| 5,712,772 A | * | 1/1998 | Telefus | H02M 1/38 363/21.02 |
| 5,796,595 A | * | 8/1998 | Cross | H02M 3/285 363/131 |
| 5,805,434 A | * | 9/1998 | Vinciarelli | H02M 1/34 363/16 |
| 6,069,803 A | * | 5/2000 | Cross | H02M 3/33569 363/21.14 |

(Continued)

*Primary Examiner* — Kyle J Moody
(74) *Attorney, Agent, or Firm* — Harness, Dickey & Pierce, P.L.C.

(57) ABSTRACT

A power supply system includes a flyback power converter and a control circuit coupled to the flyback power converter. The power converter includes an input, an output, a transformer having a plurality of windings coupled between the input and the output, a first power switch coupled to the transformer and a clamping circuit having a capacitor, a diode, and a second power switch coupled to one of the plurality of windings. The capacitor and the diode are coupled in parallel between the winding and the second power switch. The control circuit is configured to operate the power converter in a discontinuous conduction mode and control the first power switch and the second power switch at a fixed frequency to achieve substantially zero voltage switching during turn on of the first power switch. Various other example power supply systems, power converters, and methods for controlling a power converter are also disclosed.

15 Claims, 4 Drawing Sheets

(56) References Cited

U.S. PATENT DOCUMENTS

| | | | | |
|---|---|---|---|---|
| 6,496,392 B2* | 12/2002 | Odell | ................... | H02M 1/34 |
| | | | | 363/56.11 |
| RE38,196 E * | 7/2003 | Vinciarelli | .............. | H02M 1/34 |
| | | | | 363/16 |
| 7,298,631 B2* | 11/2007 | Tsuruya | ............ | H02M 3/33569 |
| | | | | 363/21.01 |
| 7,649,757 B2* | 1/2010 | Lin | ................... | H02M 3/33569 |
| | | | | 363/21.12 |
| 7,924,578 B2* | 4/2011 | Jansen | ............. | H02M 3/33507 |
| | | | | 363/21.02 |
| 8,000,112 B2* | 8/2011 | Zhang | .................... | H02M 1/34 |
| | | | | 363/21.01 |
| 8,488,343 B2* | 7/2013 | Hong | ................ | H02M 3/33569 |
| | | | | 363/21.18 |
| 8,520,410 B2* | 8/2013 | Telefus | ............. | H02M 3/33569 |
| | | | | 363/21.02 |
| 8,693,223 B2* | 4/2014 | Lin | ................... | H02M 3/33507 |
| | | | | 363/21.03 |
| 8,743,565 B2* | 6/2014 | Telefus | ............. | H02M 3/33523 |
| | | | | 363/21.02 |
| 8,885,362 B2* | 11/2014 | Kuang | ............... | H05B 33/0815 |
| | | | | 363/21.12 |
| 9,019,724 B2* | 4/2015 | Telefus | ............. | H02M 3/33523 |
| | | | | 363/21.01 |
| 2014/0022828 A1* | 1/2014 | Metzler | ............... | H02M 1/4258 |
| | | | | 363/44 |
| 2016/0126853 A1* | 5/2016 | Davila | .............. | H02M 3/33569 |
| | | | | 363/21.14 |

* cited by examiner

FIXED FREQUENCY DISCONTINUOUS CONDUCTION MODE FLYBACK POWER CONVERTERS EMPLOYING ZERO VOLTAGE SWITCHING

CROSS-REFERENCE TO RELATED APPLICATION

This application claims the benefit of U.S. Provisional Application No. 62/207,208 filed Aug. 19, 2015. The entire disclosure of the above application is incorporated herein by reference.

FIELD

The present disclosure relates to fixed frequency discontinuous conduction mode flyback power converters employing zero voltage switching.

BACKGROUND

This section provides background information related to the present disclosure which is not necessarily prior art.

Power converters typically include power switches. Commonly, it is desirable to turn on and/or off these power switches through soft switching (e.g., zero voltage switching and/or zero current switching). In some instances, ringing may cause a voltage across the power switches to oscillate. In such cases, switching may take place at a valley point of the oscillating voltage.

SUMMARY

This section provides a general summary of the disclosure, and is not a comprehensive disclosure of its full scope or all of its features.

According to one aspect of the present disclosure, a power supply system for supplying power to a load includes a flyback power converter and a control circuit coupled to the flyback power converter. The flyback power converter includes an input for receiving an input voltage, an output for supplying an output voltage to a load, a transformer having a plurality of windings coupled between the input and the output, a first power switch coupled to the transformer and a clamping circuit having a capacitor, a diode, and a second power switch coupled to one of the plurality of windings. The capacitor and the diode are coupled in parallel between said one of the plurality of windings and the second power switch. The control circuit is configured to operate the flyback power converter in a discontinuous conduction mode (DCM) and control the first power switch and the second power switch at a fixed frequency to achieve substantially zero voltage switching during turn on of the first power switch.

According to another aspect of the present disclosure, a method for controlling a flyback power converter to operate in a DCM is disclosed. The flyback power converter includes a transformer having a plurality of windings, a first power switch coupled to the transformer, a capacitor, a diode, and a second power switch coupled to one of the plurality of windings. The capacitor and the diode are coupled in parallel between said one of the plurality of windings and the second power switch. The first power switch and the second power switch are switched at a fixed frequency to achieve substantially zero voltage switching during turn on of the first power switch. The method includes discharging at least a portion of a voltage of the capacitor to said one of the plurality of windings, in response to discharging the capacitor, clamping a voltage of said one of the plurality of windings such that current circulates through the diode and the second power switch to prevent the capacitor from being charged, and switching the second power switch off to drain the voltage of said one of the plurality of windings to an input of the power converter thereby causing a voltage across the first power switch to be substantially zero.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
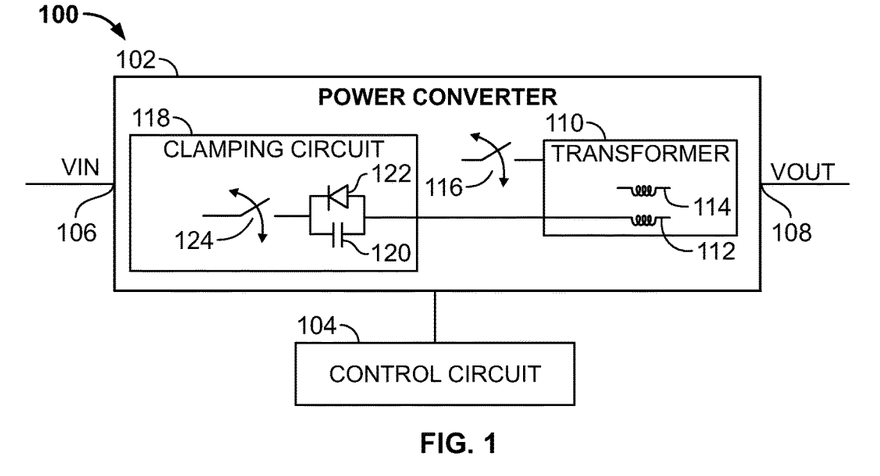
FIG. 1 is a block diagram of a power supply system including a fixed frequency DCM flyback power converter having a clamping circuit including a diode and a capacitor coupled in parallel according to one example embodiment of the present disclosure.

A power supply system for supplying power to a load according to one example embodiment of the present disclosure is illustrated in FIG. 1 and indicated generally by reference number 100. As shown in FIG. 1, the power supply system 100 includes a flyback power converter 102 and a control circuit 104 coupled to the flyback power converter 102. The flyback power converter 102 includes an input 106 for receiving an input voltage Vin, an output 108 for supplying an output voltage Vout to a load (not shown), a transformer 110 having windings 112, 114 coupled between the input 106 and the output 108 and a power switch 116 coupled to the transformer 110. The flyback power converter 102 further includes a clamping circuit 118 having a capacitor 120, a diode 122, and a power switch 124 coupled to one of the windings (e.g., the winding 112) of the transformer 110. As shown in FIG. 1, the capacitor 120 and the diode 122 are coupled in parallel between the winding 112 and the power switch 124. The control circuit 104 operates the flyback power converter 102 in a DCM and controls the power switches 116, 124 at a fixed frequency to achieve substantially zero voltage switching (ZVS) during turn on of the power switch 116.

In some examples, the power switch 124 of the clamping circuit 118 may achieve substantially ZVS during turn on due in part to the capacitor 120 and one or the transformer windings as further explained herein. Therefore, both power switches 116, 124 can achieve substantially ZVS during turn on.

Thus, by employing the clamping circuit 118 (e.g., the parallel combination of the capacitor 120 and the diode 122) and/or other clamping circuits disclosed herein, soft switching (e.g., ZVS) of one or more power switches may be achieved during turn on of the power switches. Therefore, by using the clamping circuits disclosed herein, soft switching of the power switches may be achieved independent of, for example, a turns ratio of a transformer, a value of a reflected output voltage V_OR (e.g., a reflected voltage across a primary winding of a transformer), a load, an input voltage, etc. which are commonly relied on for achieving soft switching.

As explained above, the control circuit 104 controls the power switches 116, 124 at a fixed frequency. For example, and as further explained below, the control circuit 104 may provide a pulse width modulated (PWM) signal to each power switch 116, 124 at a fixed frequency. The PWM signals may be phase shifted such that the signals do not overlap (e.g., sometimes referred to as opposing PWM signals). In such examples, one power switch is on (e.g., closed) while the other power switch is off (e.g., open).

Additionally, and as explained above, the flyback converter 102 is operated in its DCM. As such, all energy stored in the transformer 110 is provided to its secondary during a flyback period (e.g., when the power switch 116 is off), and current in its primary side falls back to zero before the power switch 116 turns on again.

Figure 2:
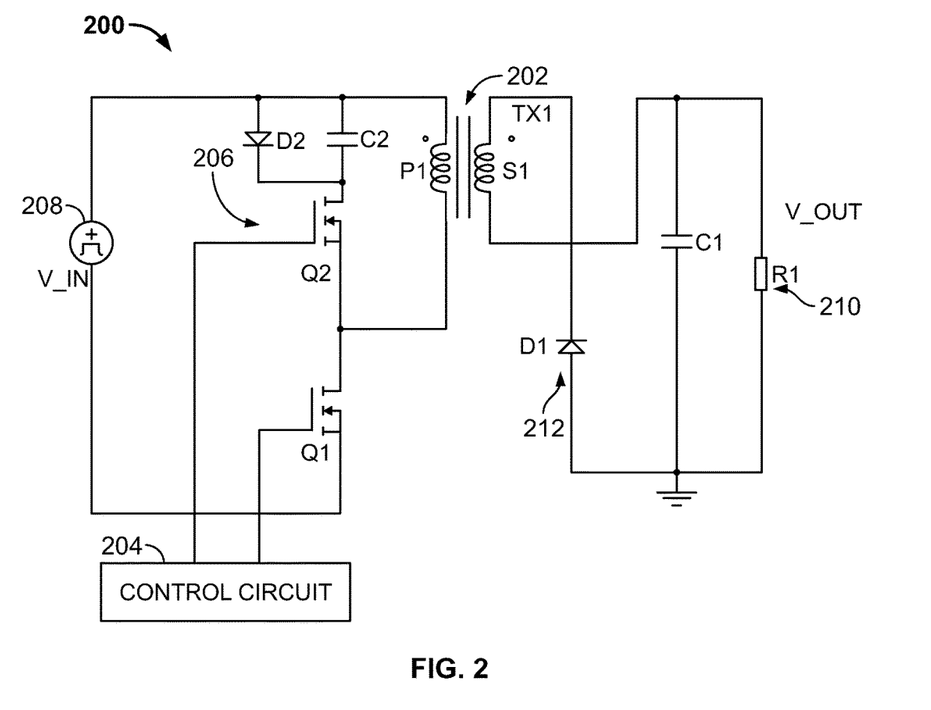
FIG. 2 is a circuit schematic of a power supply system including a fixed frequency DCM flyback power converter having a transformer and a clamping circuit including a diode and a capacitor coupled in parallel and to a primary side of the transformer according to another example embodiment.

FIG. 2 illustrates a power supply system 200 including one example of a resonant flyback converter 202, a control circuit 204, and a clamping circuit 206. The flyback converter 202 is operated (e.g., controlled) similar to the flyback converter 102 of FIG. 1 For example, the control circuit 204 operates the flyback power converter 202 in its DCM and controls power switches (further explained below) of the converter 202 at a fixed frequency to achieve substantially ZVS.

As shown in FIG. 2, the fixed frequency DCM flyback converter 202 includes a transformer TX1 having a primary winding P1 and a secondary winding S1, and a power switch Q1 coupled to the primary winding P1 of the transformer TX1. The primary winding P1 receives an input voltage V_IN from an input voltage source 208 (e.g., when the power switch Q1 on) and provides an output voltage V_OUT to a load 210 (e.g., shown as a resistor R1).

Similar to the clamping circuit 118 of FIG. 1, the clamping circuit 206 of FIG. 2 includes a power switch Q2 coupled to one of the windings of the transformer TX1. In the particular example of FIG. 2, the power switch Q2 is coupled to the primary winding P1 of the transformer TX1. However, and as further explained below, the power switch Q2 may be coupled to another winding of the transformer TX1 including, for example, the secondary winding S1, a tertiary winding (not shown) of the transformer TX1, etc.

As shown in FIG. 2, the clamping circuit 206 further includes a diode D2 and a capacitor C2 coupled in parallel between the primary winding P1 of the transformer TX1 and the power switch Q2. For example, the parallel coupled capacitor C2 and diode D2 are coupled to one end of the primary winding P1 and the power switch Q2 is coupled to the other end of the primary winding P1. As such, the power switch Q2 and the parallel coupled capacitor C2 and diode D2 are coupled across the primary winding P1 of the transformer TX1.

In some embodiments, the power converter 202 may include a rectification circuit 212 coupled to the transformer TX1. For example, and as shown in FIG. 2, the power converter 202 includes a diode D1 coupled to a secondary side of the transformer TX1 for rectifying the transformer's output. In the particular example of FIG. 2, the diode D1 is coupled between the secondary winding S1 of the transformer TX1 and a filter (e.g., shown as a capacitor C1). Although, the rectification circuit 212 of FIG. 2 is shown as a single diode D1 (e.g., a half-wave rectification circuit), another suitable rectification circuit such as a full-wave rectification circuit may be employed.

Figure 3:
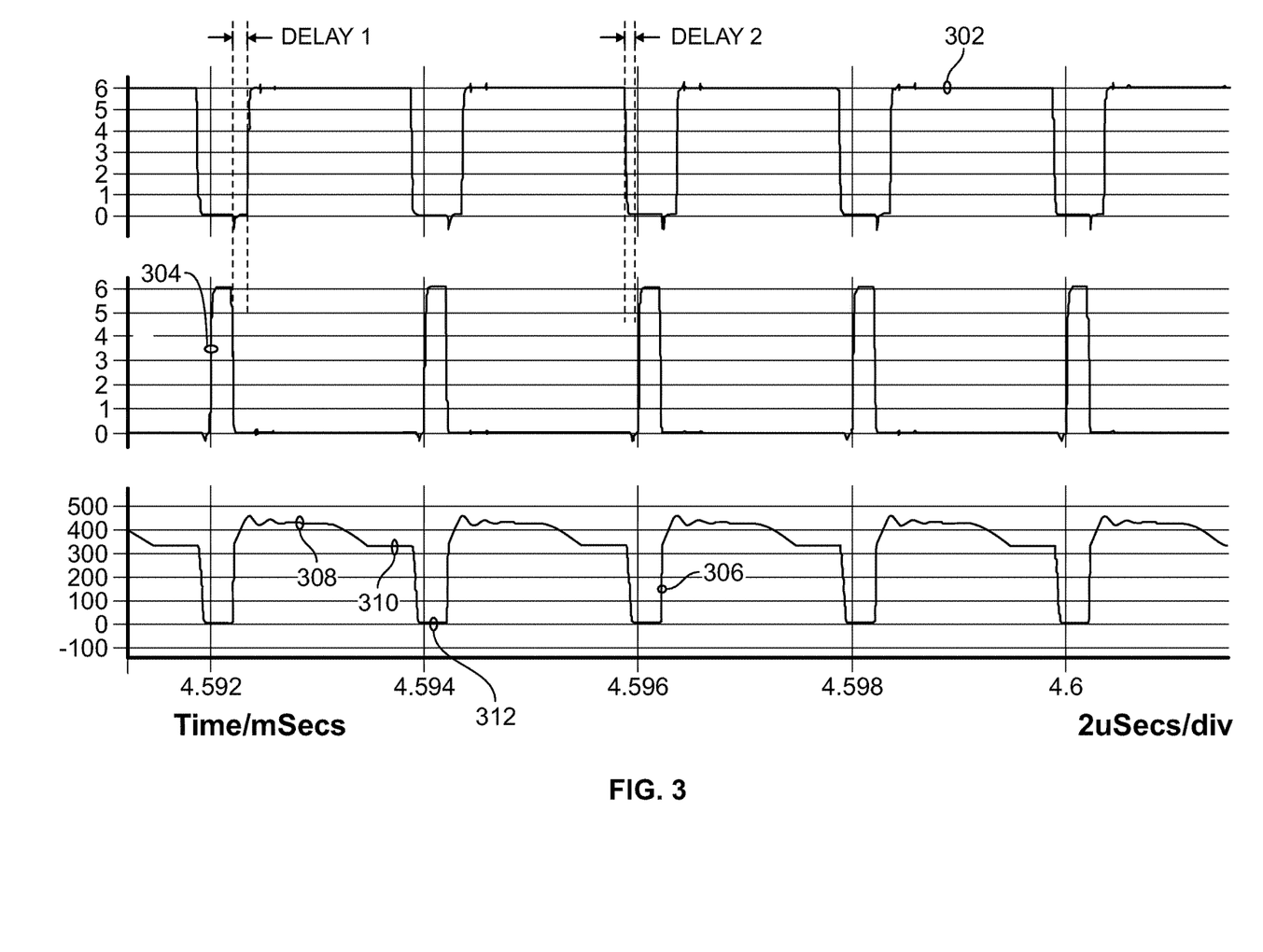
FIG. 3 is a graph of waveforms representing control signals for controlling power switches of the power converter of FIG. 2 and a voltage across one of the power switches.

As shown in FIG. 2, the control circuit 204 provides control signals to the power switches Q1, Q2. For example, FIG. 3 illustrates a PWM signal 302 provided to the power switch Q2 and a PWM signal 304 provided to the power switch Q1. Each signal 302, 304 may be modulated to, for example, regulate the output voltage V_OUT of the power converter 202, etc. As shown in FIG. 3, the PWM signals 302, 304 are phase shifted with respect to each other to create opposing PWM signals and have different duty cycles (e.g., the duty cycles may be inversely related).

During operation of the flyback power converter 202, the power switch Q1 is switched on coupling the primary winding P1 of the transformer TX1 to the input voltage source V_IN. As a result, current flows from the input voltage source V_IN to the primary winding P1 of the transformer TX1 (via the closed power switch Q1). During this time, the transformer TX1 stores energy provided from the input voltage source V_IN. At some later time, the power switch Q1 is switched off thereby disconnecting the primary winding P1 from the input voltage source V_IN.

After the power switch Q1 is switched off, the power switch Q2 is switched on coupling the primary winding P1 of the transformer TX1 to the capacitor C2 of the clamping circuit 206. As such, current flows from the primary winding P1 to the capacitor C2 (via the power switch Q2). As shown in FIG. 3, the power switch Q2 may be switched on after a period of time (e.g., referred to as "DELAY 1") of when the power switch Q1 is switched off. Thus, the ON times of the PWM signals 302, 304 are separated by a period of time (DELAY 1).

The capacitor C2 is charged to a voltage substantially equal to a reflected output voltage V_OR (e.g., the voltage across the primary winding P1 of the transformer TX1). In the particular example of FIG. 2, the reflected output voltage (V_OR) is equal to the output voltage V_OUT plus a forward voltage drop (Vd) of the diode D1 (of the rectification circuit 212) multiplied by the turns ratio of the transformer TX1 (e.g., V_OR=(V_OUT+Vd)×(NP1/NS1)). The capacitor C2 stores an energy based on the reflected output voltage and possible leakage inductance from the transformer TX1. Thus, a voltage across the capacitor C2 may be equal to the reflected output voltage V_OR and a voltage corresponding to the leakage inductance from the transformer TX1.

In the example of FIG. 2, a voltage across the power switch Q1 (at this time) is equal to the input voltage V_IN plus the voltage across the capacitor C2. For example, FIG. 3 illustrates the voltage across the power switch Q1 (represented by line 306) during multiple switching cycles of the flyback power converter 202 of FIG. 2. If the input voltage V_IN is about 300 V and the reflected output voltage V_OR is about 100 V, the voltage across the power switch Q1 may be equal to about 400 V (plus a voltage corresponding to the leakage inductance from the transformer TX1) after the power switch Q2 is switched on. This is shown by a line segment 308 of FIG. 3.

During this time, the secondary winding S1 begins to deliver energy (stored in the transformer TX1 as explained above) to the load 210 via the rectification circuit 212. Additionally, the leakage inductance stored in the capacitor C2 is transferred to the load 210 by resonant action of the capacitor C2 and transformer leakage of the transformer TX1. After the leakage inductance stored in the capacitor C2 is transferred to the load 210, the voltage across the capacitor C2 remains at the reflected output voltage level as explained above. Some ringing, however, may occur when the leakage inductance stored in the capacitor C2 is transferred to the load 210 due to, for example, resonance between an effective capacitance across the power switch Q1 (further explained below) and the primary winding P1.

Once the energy stored in the transformer TX1 is delivered to the load 210, the capacitor C2 discharges its stored energy (e.g., the reflected output voltage V_OR across the capacitor C2) to the transformer TX1. For example, the capacitor C2 resonates with the primary winding P1 and discharges its stored remaining energy to the primary winding P1. This stored remaining energy is transferred to the transformer TX1 in an opposite direction as compared to when the capacitor C2 was charged. For example, current flows through the same loop (e.g., the capacitor C2, the primary winding P1, and the power switch Q2) as when the capacitor C2 was charged, but in the opposite direction.

Because the capacitor C2 discharges the reflected output voltage V__OR, the voltage across the power switch Q1 decreases as well. For example, and as shown in FIG. 3, the voltage across the power switch Q1 decreases to about the input voltage V_IN (e.g. about 300 V as shown by line segment 310 of FIG. 3) of the flyback power converter 202.

Once the capacitor C2 is discharged, the diode D2 clamps the voltage (e.g., the reflected output voltage V_OR) of the primary winding P1 causing current to circulate through the diode D2 and the power switch Q2. This prevents the capacitor C2 from charging again (during this cycle) in an opposite direction as compared to the initial charge of the capacitor C2. As such, the diode D2 ensures the energy transferred to (and stored by) the transformer TX1 is retained in the transformer TX1 and not passed back to the capacitor C2. This may be considered a controlled storage of energy in the transformer TX1.

At some later point in time, the power switch Q2 is switched off, disconnecting the primary winding P1 of the transformer TX1 from the clamping circuit 206. As such, the energy (e.g., the reflected output voltage V_OR) stored in the primary winding P1 is drained to the input voltage source 208.

Additionally, during this time the effective capacitance across the power switch Q1 is drained from a drain node of the power switch Q1 (e.g., the node between the power switches Q1, Q2 in the example of FIG. 2), through the primary winding P1 of the transformer TX1, and to the input voltage source 208. The effective capacitance may include, for example, intrinsic capacitance of the power switch Q1 (commonly referred to as Capacitance Coss), reflected capacitance of the diode D1 (and/or other components of the rectification circuit 212), a transformer shunt winding capacitance, and/or other circuit parasitic capacitances.

Draining the effective capacitance across the power switch Q1 causes the voltage across the power switch Q1 to decrease to a valley point (e.g., a low point in the voltage in which a power switch is generally switched). For example, if a value of the capacitor C2 is designed appropriately, the effective capacitance may completely discharge thereby causing the voltage across the power switch Q1 to fall to zero (e.g., as shown by line segment 312 of FIG. 3). Thus, a voltage at the valley point may be substantially equal to zero.

For example, a value of the capacitor C2 (and other clamping circuit capacitors disclosed herein) may be designed to ensure the stored energy in the capacitor C2 during the flyback period is at least marginally higher than the energy required to achieve ZVS of the power switch Q1 at a high line input condition (e.g., a maximum input voltage V_IN specified for normal operation). In others words, the value of the capacitor C2 can be chosen so its stored energy (during the flyback period) is marginally higher than the energy needed to discharge the effective capacitance at the drain node of the power switch Q1. This stored energy in the capacitor C2 during the flyback period is equal to $0.5 \times C2 \times V^2$, where V equals the voltage across the capacitor C2 (e.g., the reflected output voltage V_OR).

For instance, the value of the capacitor C2 and an inductance of the primary winding P1 can be designed so that the capacitor C2 is fully discharged during a dead time period (e.g., a period of time from when the transformer TX1 fully discharges its stored energy to the load 210 to the next ON time of the power switch Q1). This can keep current circulating in the primary winding P1 (in the opposite direction) due to the clamping action of the diode D2 as explained above.

This approach, however, may set an upper limit on a value of the capacitor C2. For example, the quarter resonant time of a tank circuit formed by the capacitor C2 and the inductance of the primary winding P1 should be less than a minimum dead time period for desired operating conditions to ensure the capacitor C2 is fully discharged. The quarter resonant time of the tank circuit of FIG. 2 is equal to $0.5 * \pi * \sqrt{(Lp1 \times C2)}$.

After the power switch Q2 is switched off, the power switch Q1 is switched on (again) coupling the primary winding P1 of the transformer TX1 to the input voltage source V_IN as explained above. As shown in FIG. 3, the power switch Q1 may be switched on after a period of time (e.g., referred to as "DELAY 2") of when the power switch Q2 is switched off. Thus, and as explained above, the ON times of the PWM signals 302, 304 are separated by a period of time (DELAY 2).

During this period of time (DELAY 2), the voltage across the power switch Q1 falls to zero as explained above. As such, the power switch Q1 achieves ZVS when it is switched on, as shown in FIG. 3. For example, the power switch Q1 may be switched on when its body diode (not shown) conducts (e.g., forward biased) after zero voltage is reached.

Additionally, the power switch Q2 of the clamping circuit 206 may achieve substantially ZVS during turn on. For example, a body diode of the power switch Q2 may conduct allowing current to flow through the capacitor C2 and the primary winding P1 of the transformer TX1 prior to the power switch Q2 switching on. This allows the voltage across the power switch Q2 to equal substantially zero before the power switch Q2 is switched on.

Figure 4:
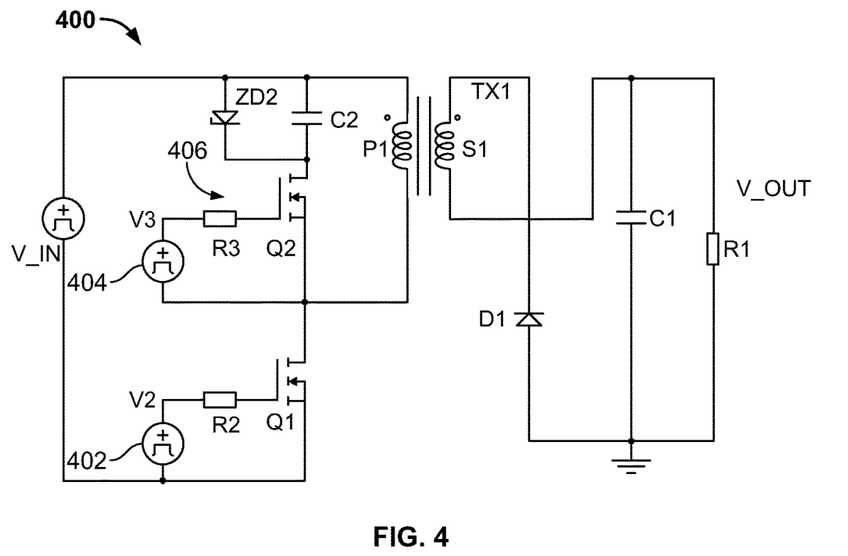
FIG. 4 is a circuit schematic of a power supply system including a fixed frequency DCM flyback power converter having a clamping circuit including a zener diode and a capacitor coupled in parallel according to yet another example embodiment.

In some embodiments, the amount of stress (e.g., due to voltage spikes, etc.) placed on the power switch Q1 may be unacceptable given the desired value of the capacitor C2. In such cases, the diode D2 can be replaced with a zener diode, which limits such voltage spikes. For example, FIG. 4 illustrates a power supply system 400 substantially similar to the power supply system 200 of FIG. 2. However, the power supply system 400 includes a clamping circuit 406 having the capacitor C2 and the power switch Q2 of FIG. 2, and a zener diode ZD2 (in place of the diode D2 of FIG. 2).

The zener diode ZD2 of FIG. 4 can clamp the voltage draining from the primary winding P1 of the transformer TX1 at a safe desirable level. The other functionality of the clamping circuit 406 is similar to the clamping circuit 206 of FIG. 2, as the zener diode ZD2 acts as a diode for circulating current after the capacitor C2 discharges.

As shown in FIG. 4, the power supply system 400 includes PWM generators 402, 404 for generating PWM control signals V2, V3 having a fixed frequency. The PWM control signals V2, V3 are provided to the power switches Q1, Q2 via resisters R2, R3, respectively. Thus, one or both PWM generators 402, 404 may be considered a control circuit, part of a control circuit, etc.

Although the power supply systems 200 and 400 of FIGS. 2 and 4 include a clamping circuit coupled to a primary winding of the transformer, it should be understood that a clamping circuit may be coupled to a secondary winding of the transformer, a tertiary winding of the transformer, etc. For example, the power switch Q2 of FIG. 2 may have bidirectional operating capability. In such cases, when the power switch Q2 is switched off, current can flow from a source node of the power switch Q2 (i.e., the node coupled to the power switch Q1) to its drain node (i.e., the node coupled to the diode D2 and the capacitor C2) if its intrinsic body diode is forward biased. Additionally, current can flow in either direction when the power switch Q2 is switched on. Thus, the power switch's Q2 operation can resemble a synchronous rectifier. Therefore, a clamping circuit including the power switch Q2 may be positioned on another winding of the transformer. In such cases, the power switch Q2 may function as a synchronous rectifier and the capacitor C2 may function as a filter.

Figure 5:
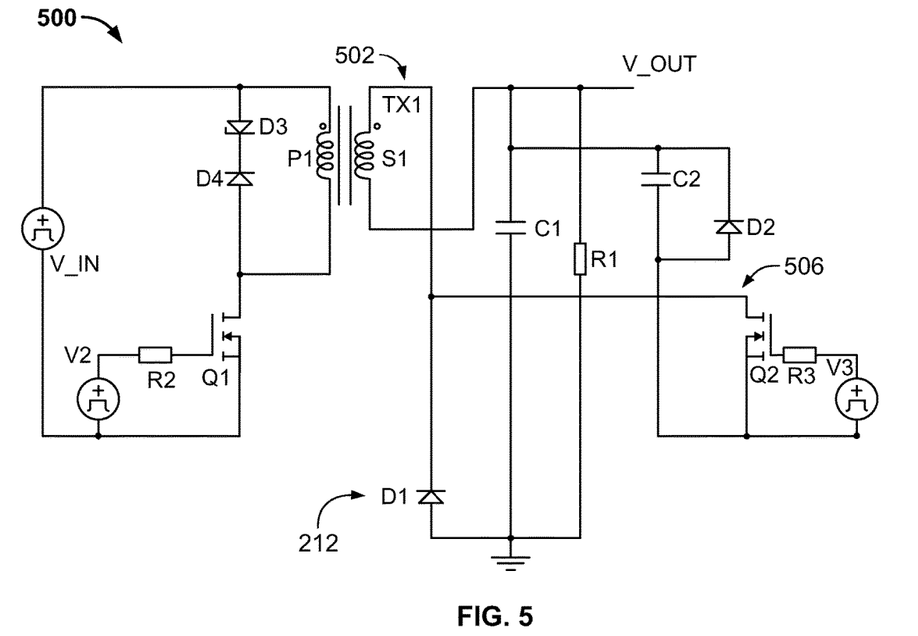
FIG. 5 is a circuit schematic of a power supply system including a fixed frequency DCM flyback power converter having a transformer and a clamping circuit positioned on a secondary side of the transformer according to another example embodiment.

For example, FIG. 5 illustrates a power supply system 500 including a flyback power converter 502 having the transformer TX1, the power switch Q1, the rectification circuit 212 (e.g., the diode D1), and the filter capacitor C1 of FIG. 2. The flyback power converter 502 further includes a clamping circuit 506 coupled to the secondary winding S1 of the transformer TX1, and diodes D3, D4 coupled to the power switch Q1 and across the primary winding P1 of the transformer TX1. The diodes D3, D4 may function as a transient-voltage-suppression diode for protection against voltage spikes. For example, the diode D3 is a zener diode and may function as explained above.

Figure 6:
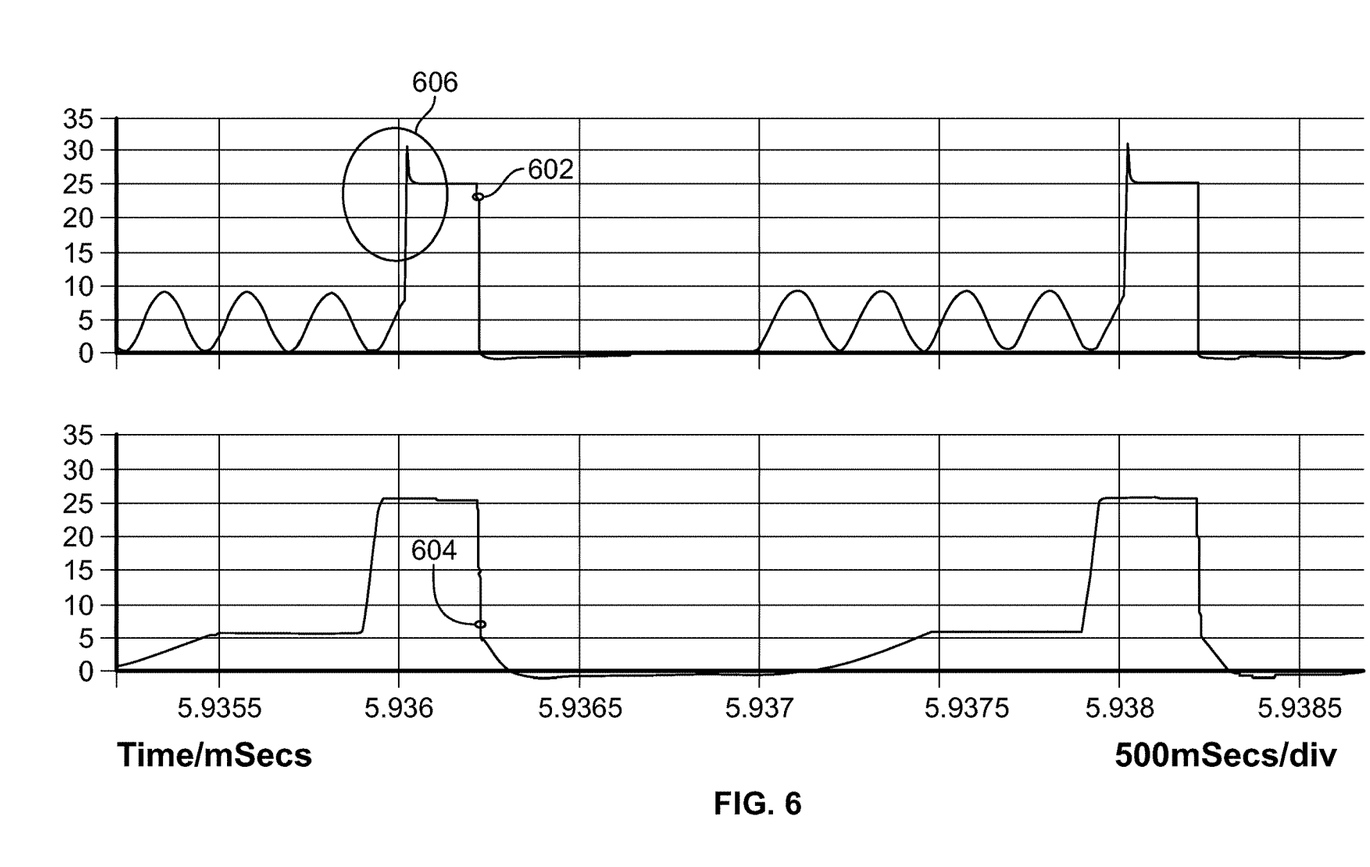
FIG. 6 is a graph of waveforms representing a voltage across a rectifier diode of a conventional system and a voltage across a rectifier diode of the power supply system of FIG. 2.

The clamping circuit 506 includes the capacitor C2, the diode D2, and the power switch Q2 of FIG. 2. For example, and as shown in FIG. 5, the capacitor C2 and the diode D2 of the clamping circuit 506 are coupled in parallel between the secondary winding S1 and the power switch Q2. Thus, and as shown in FIG. 5, the parallel coupled capacitor C2 and diode D2 are coupled to one end of the secondary winding S1 and the power switch Q2 is coupled to the other end of the secondary winding S1. As such, the power switch Q2 and the parallel coupled capacitor C2 and diode D2 of FIG. 6 are coupled across the secondary winding S1 of the transformer TX1.

The operation of the flyback power converter 502 is similar to operation of the flyback power converter 202 explained above. Likewise, a value of the capacitor C2 of FIG. 5 may have similar parameters as explained above with respect to FIG. 2.

For example, during an ON time of the power switch Q1 (and while the power switch Q2 is switched off), energy is stored in the primary winding P1 of the transformer TX1. After the power switch Q1 of FIG. 5 is switched off, energy stored in the transformer TX1 is delivered to the load 210 via the rectification circuit 212 as explained above. At the same time, the capacitor C2 charges to the same level as the output voltage V_OUT through an intrinsic body diode (not shown) of the power switch Q2. Thus, the capacitor C2 can charge while the power switch Q2 is switched off when the intrinsic body diode is forward biased.

After a period of time (e.g., a delay as explained above), the power switch Q2 is switched on. Once the transformer TX1 is fully discharged, the energy stored in the capacitor C2 is transferred to the secondary winding S1 through the power switch Q2 in a reverse direction. However, after the capacitor C2 fully discharges, current keeps circulating in secondary winding S1 due to the diode D2 clamping the voltage of the secondary winding S1.

After a period of time, the power switch Q2 is switched off before the power switch Q1 is switched on. This allows adequate time for the voltage across the power switch Q1 to reach zero by using the energy stored and retained in the transformer in the reverse direction as explained above.

The control circuits disclosed herein may include an analog control circuit, a digital control circuit (e.g., a digital signal control circuit (DSC), a digital signal processor (DSP), etc.), or a hybrid control circuit (e.g., a digital control circuit and an analog circuit). Additionally, the control circuits may include one or more processors for implementing converter control features as explained herein. One or more components (e.g., processor(s), etc.) of the control circuits may be disposed on one or more integrated circuits.

The power switches disclosed herein may be MOSFETs as shown in FIGS. 2, 4 and 5. In other embodiments, one or more power switches of the flyback power converters disclosed herein may be other suitable power switches including, for example, other types of transistors, etc. if desired.

Additionally, the delays disclosed herein (e.g., DELAY 1, DELAY 2, etc.) may be any suitable amount of time to achieve ZVS depending on, for example, designs parameters, components values, etc. For example, and with reference to FIGS. 2 and 3, DELAY 1 may be determined based in part on the summation of events. One such event can include a turn off delay of the power switch Q1 signifying a drain voltage rise time of the power switch Q1 that is based on a drive fall time of the control signal 304 to the power switch Q1. Another event may include a charging time of the clamp capacitor C2 which may be determined by the reflected output voltage across the primary winding P1 (as explained above), a winding resistance of the primary winding P1, and a voltage drop of the power switch's Q2 body diode.

Likewise, DELAY 2 may be determined based in part on a time required for a drain voltage of the power switch Q1 to fall to zero (e.g., from about the input voltage V_IN to zero as shown in FIG. 3). This may be substantially the same amount of time required to charge an intrinsic capacitance Coss of the power switch Q2 and discharge the intrinsic capacitance Coss of the power switch Q1 to the input voltage source 208 via the primary winding P1 (as explained above).

For example, and as shown in FIG. 3, the DELAY 1 and/or the DELAY 2 may be about 0.0002 milliseconds (e.g., 0.2 microseconds). In other embodiments, the DELAY 1, the DELAY 2, and/or other delays disclosed herein may be more or less than about 0.2 microseconds.

Moreover, the power converters disclosed herein may be employed in various different applications. For example, the power converters may be part of a power supply system used for AC/DC conversion (e.g., as shown in FIGS. 2, 4 and 5), DC/DC conversion, etc. In some examples, the power converters may be used as a low powered flyback converter, a medium powered flyback converter, etc. in power supplies for adapters, chargers, etc. For instance, the power converters may be used in 5 W-10 W power supplies of chargers for low powered electronic devices such as cellphones, tablets, etc. and 70 W-200 W power supplies of chargers for medium powered electronic devices such as notebooks, televisions (e.g., LED televisions, etc.), gaming consoles, etc. In other examples, the power converters may be used in medical rated power supplies which employ small Y-capacitors that, for example, filter common mode noise, etc.

As explained herein, one or more of the power switches (e.g., switches 116, 124, Q1, Q2) of the power converters disclosed herein may achieve substantially ZVS during turn on. In some embodiments, the power switch(es) may achieve substantially ZVS only during turn on. Put another way, the power switch(es) may achieve may not achieve substantially ZVS during turn off.

By employing one or more features disclosed herein, at least one of the power switches achieves ZVS turn on thereby causing switching losses to minimize and efficiency to increase in its power converter. Additionally, common mode emissions (e.g., radiated electromagnetic interference (EMI), conducted EMI, etc.) may be reduced as compared to conventional systems due to a slower change in voltage over a change in time (e.g., dV/dT) in switching transitions. Further, by employing one or features disclosed herein, a snubber circuit otherwise needed to prevent radiated EMI from reaching the load is not required. Thus, and as shown in FIGS. 2, 4 and 5, no snubber circuit is coupled to the rectification circuit.

For example, FIG. 6 illustrates waveforms 602, 604 representing a voltage across a rectifier diode. In particular, the waveform 602 represents a voltage across a rectifier diode of a conventional flyback power converter and the waveform 604 represents a voltage across the rectifier diode D1 of the flyback power converter 202 of FIG. 2. High frequency ringing in the waveform 604 is substantially reduced (and in some cases eliminated as shown in FIG. 6) compared to the waveform 602. The high frequency ringing in the waveform 602 is generally indicated by the circle 606.

Additionally, due to the clamping circuits disclosed herein, minimal energy is stored and maintained in a primary winding through current circulation (as explained herein) to achieve ZVS operation. As such, the necessary energy for ZVS operation is stored and maintained in the primary winding. Further, the ZVS operation may be independent of a transformer turns ratio, a reflected output voltage, etc. thereby increasing circuit design flexibility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply system for supplying power to a load, the power supply system comprising:
 a flyback power converter including an input for receiving an input voltage, an output for supplying an output voltage, a transformer having a plurality of windings coupled between the input and the output, a first power switch coupled to the transformer, and a clamping circuit having a capacitor, a diode, and a second power switch coupled to one of the plurality of windings, the capacitor and the diode of the clamping circuit coupled in parallel between said one of the plurality of windings and the second power switch; and
 a control circuit coupled to the flyback power converter, the control circuit configured to operate the flyback power converter in a discontinuous conduction mode and control the first power switch and the second power switch at a fixed frequency to allow an effective capacitance across the first power switch to discharge to said one of the plurality of windings to cause a voltage across the first power switch to decrease to substantially zero to achieve substantially zero voltage switching during turn on of the first power switch.

2. The power supply system of claim 1 wherein said one of the plurality of windings includes a first end and a second end, wherein the capacitor and the diode are coupled to the first end of said one of the plurality of windings, and wherein the second power switch is coupled to the second end of said one of the plurality of windings.

3. The power supply system of claim 2 wherein said one of the plurality of windings is a secondary winding of the transformer and wherein the second power switch of the clamping circuit is coupled to the secondary winding of the transformer.

4. The power supply system of claim 2 wherein said one of the plurality of windings is a primary winding of the transformer and wherein the second power switch of the clamping circuit is coupled to the primary winding of the transformer.

5. The power supply system of claim 4 wherein the diode is a zener diode.

6. The power supply system of claim 1 wherein the control circuit is configured to provide opposing pulse width modulated signals to the first power switch and the second power switch and wherein ON times of the opposing pulse width modulated signals are separated by a period of time.

7. The power supply system of claim 1 wherein the capacitor is configured to discharge a voltage to said one of the plurality of windings when the second power switch is switched on and wherein the diode is configured to clamp a voltage of said one of the plurality of windings when the capacitor is discharged.

8. The power supply system of claim 7 wherein the diode is configured to prevent the capacitor from charging after the capacitor is discharged when the second power switch is switched on.

9. The power supply system of claim 1 wherein the transformer includes a primary side coupled to the input of the flyback power converter and a secondary side coupled to the output of the flyback power converter and wherein the flyback power converter includes a rectification circuit coupled to the secondary side of the transformer.

10. The power supply system of claim 1 wherein the control circuit is configured to control the second power switch of the clamping circuit to achieve substantially zero voltage switching during turn on of the second power switch.

11. A method for controlling a flyback power converter to operate in a discontinuous conduction mode, the flyback power converter including a transformer having a plurality of windings, a first power switch coupled to the transformer, a capacitor, a diode, and a second power switch coupled to one of the plurality of windings, the capacitor and the diode coupled in parallel between said one of the plurality of windings and the second power switch, the first power switch and the second power switch switched at a fixed frequency to achieve substantially zero voltage switching during turn on of the first power switch, the method comprising:
 discharging at least a portion of a voltage of the capacitor to said one of the plurality of windings;
 in response to discharging the capacitor, clamping a voltage of said one of the plurality of windings such that current circulates through the diode and the second power switch to prevent the capacitor from being charged; and
 switching the second power switch off to drain the voltage of said one of the plurality of windings to an input of the flyback power converter thereby causing a voltage across the first power switch to be substantially zero.

12. The method of claim 11 further comprising switching the second power switch on to charge the capacitor to a voltage greater than or equal to a voltage across said one of the plurality of windings.

13. The method of claim 11 further comprising switching the first power switch on after a period of time from when the second power switch is switched off to couple a primary side of the transformer to an input of the power converter.

14. The method of claim 13 wherein said one of the plurality of windings is a secondary winding of the transformer.

15. The method of claim 13 wherein said one of the plurality of windings is a primary winding of the transformer.

* * * * *